INVENTOR
ALAN W. WILKERSON

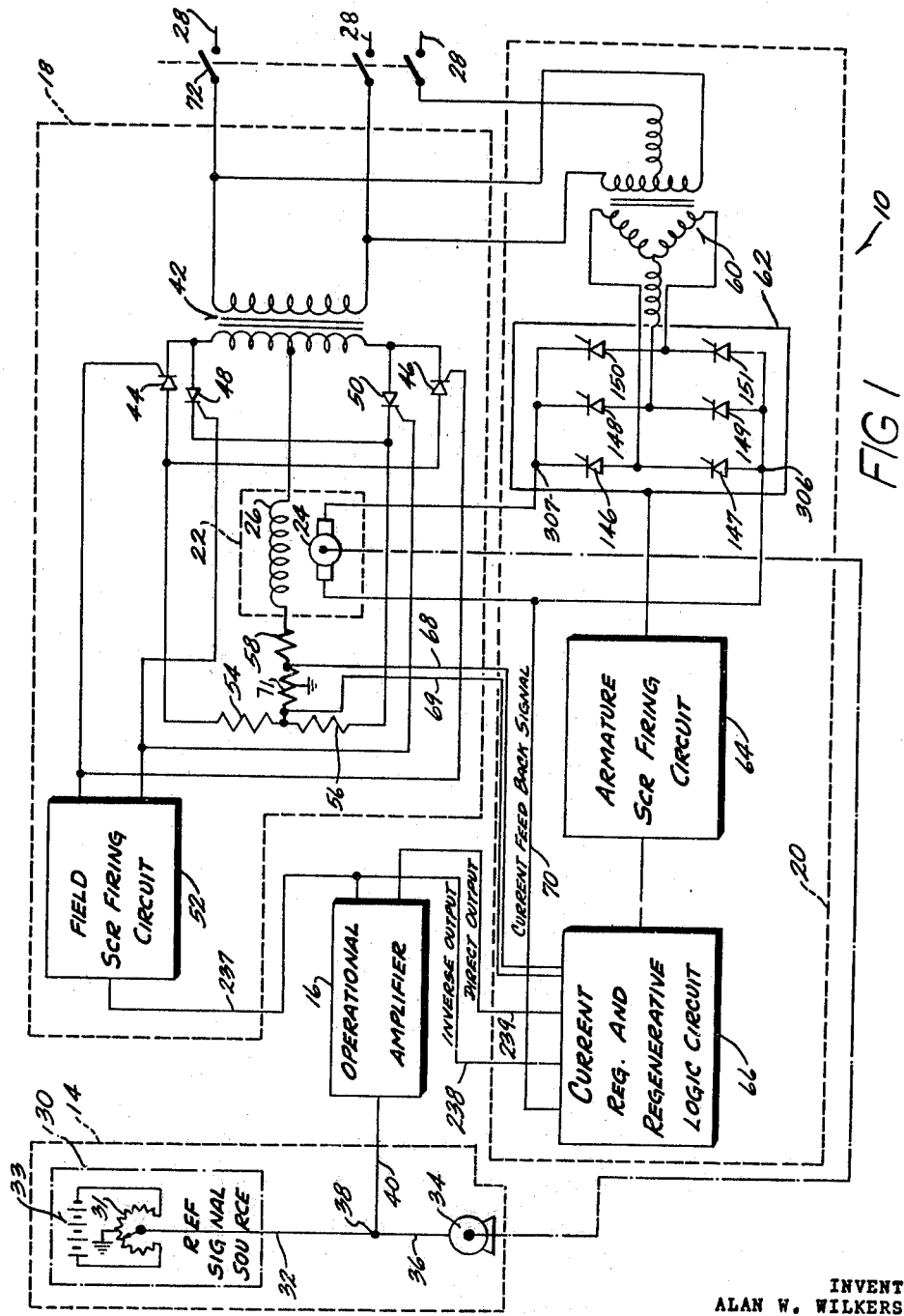

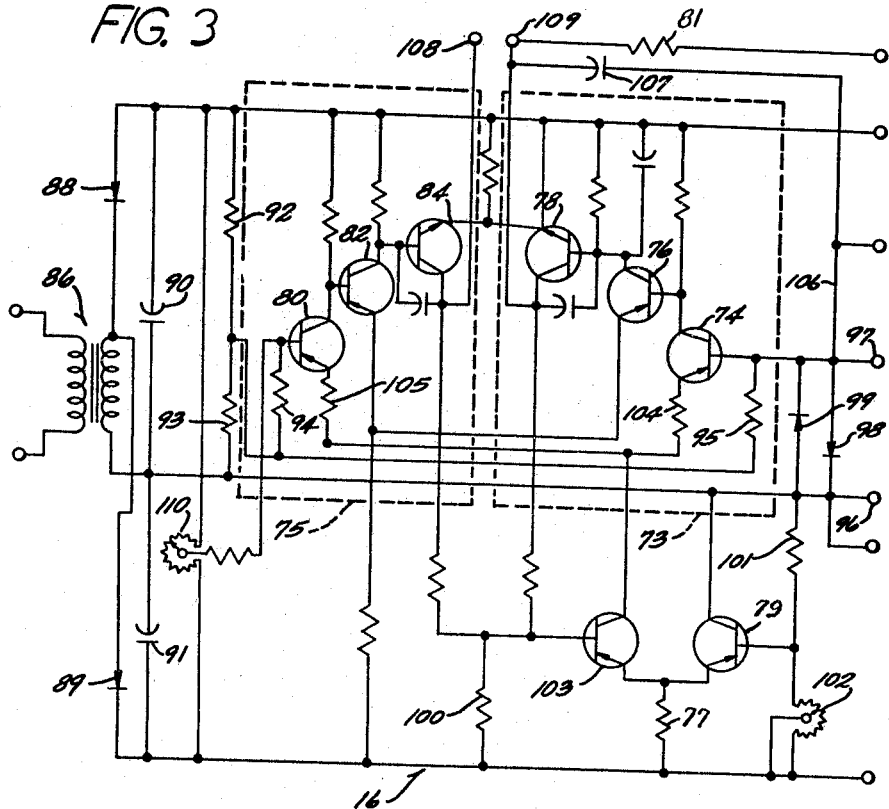
FIG. 3
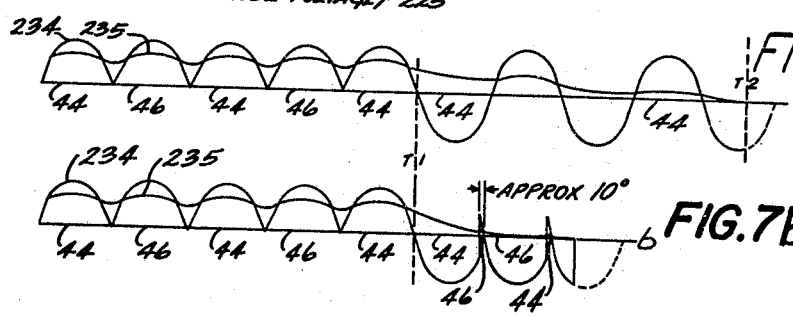
FIG. 2
FIG. 7a
FIG. 7b
INVENTOR
ALAN W. WILKERSON
BY Lieber & Nilles
ATTORNEYS

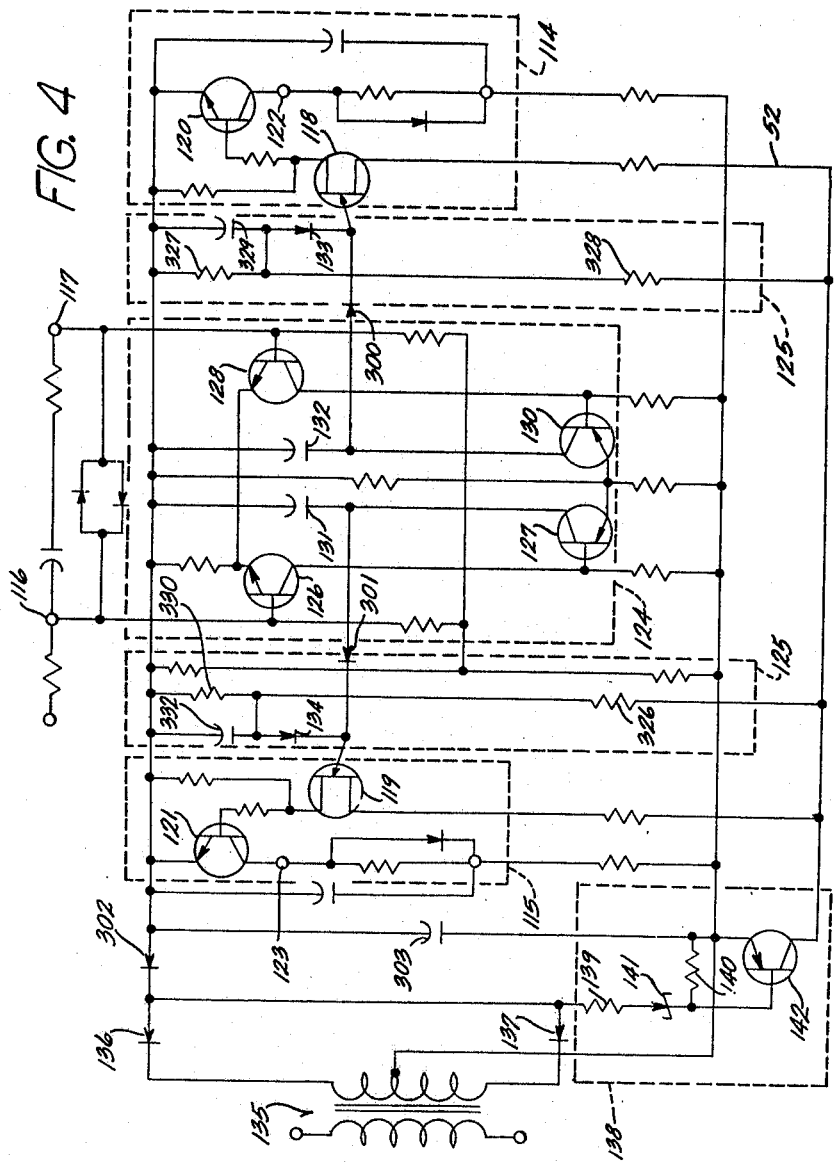

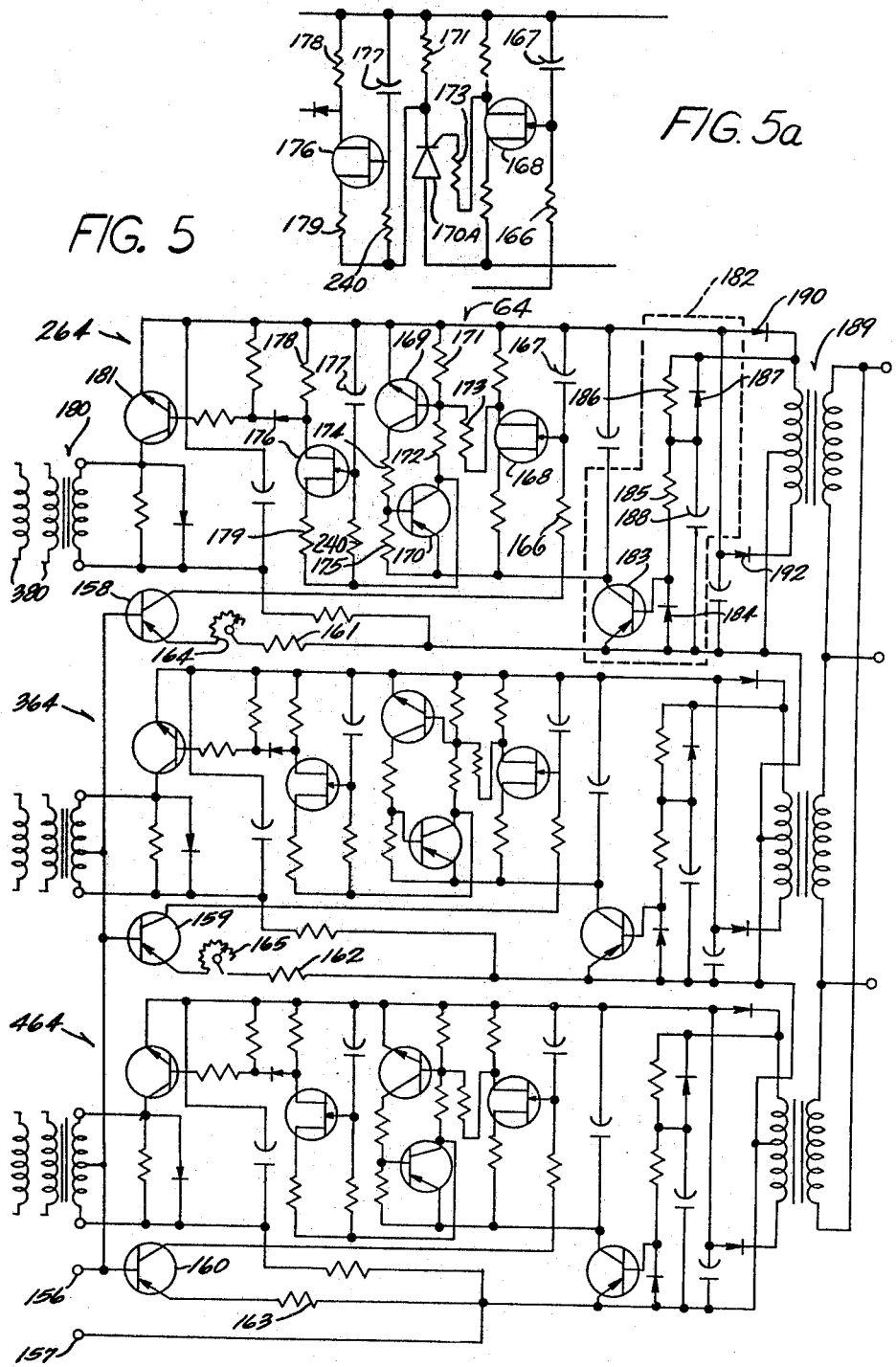

United States Patent Office 3,486,102
Patented Dec. 23, 1969

3,486,102
MULTIPLE PULSE, EXTENDED RANGE CONTROLLED RECTIFIER FIRING CIRCUIT
Alan W. Wilkerson, Thiensville, Wis., assignor, by mesne assignments, to Web Press Engineering, Inc., Addison, Ill., a corporation of Illinois
Original application Oct. 21, 1965, Ser. No. 499,409, now Patent No. 3,435,316, dated Mar. 25, 1969. Divided and this application Oct. 21, 1968, Ser. No. 769,290
Int. Cl. H02k 7/106
U.S. Cl. 321—5    9 Claims

ABSTRACT OF THE DISCLOSURE

A controlled rectifier firing circuit includes a plurality of firing amplifiers connected to complementary pairs of controlled rectifiers connected in a polyphase alternating current bridge. Each of the firing amplifiers includes a synchronizing circuit for providing an energizing signal to the remainder of the firing amplifier. An input signal means is responsive to the input signal to the firing circuit and provides a pulse in accordance with the magnitude of the input signal. A current control device is operable by said pulses to cause a pulse generating means to provide multiple firing pulses to thse controlled rectifiers.

Cross references to related applications

This application is a divisional application of copending application, Ser. No. 499,409, filed Oct. 21, 1965, now issued as U.S. Patent 3,435,316 on Mar. 25, 1969.

Background of the invention—Field of the invention

The present invention relates to firing circuits for controlled rectifiers. Such firing circuits may be utilizable in the armature circuit of a field reversing static, regenerative direct current motor control.

Background of the invention—Description of the prior art
DC motor braking—General Many applications of DC motors require that the motor be braked during operation. For example, extremely accurate speed control may require that the motor be braked as soon as it exceeds a desired speed. Other examples include DC motors subjected to overhauling loads, as in crane, hoist, and elevator service.

The method and apparatus for controlling such braking action have presented problems for many years. A simple mechanical brake on the motor output shaft is sometimes employed. While such a device is inexpensive, its braking action is difficult to control. Maintenance of the mechanical brake also raises problems. The use of an external electro-mechanical brake, such as an eddy current brake, solves some of the foregoing problems but, on the whole, external brakes have generally proven unsatisfactory.

A DC motor may also be braked by adjusting the energization of the armature and field of the motor. One such method is termed plugging and involves reversing the motor armature voltage and current when it is desired to brake the motor. While the reduction in speed is rapid and the electrical apparatus required is little and inexpensive, the high circulating currents in the armature circuit place a large thermal strain on the motor. Repeated braking operations cannot be performed without excessive heating and damage to the motor.

In dynamic braking of a DC motor, a resistor is placed in the armature circuit. The motor in effect becomes a DC generator supplying power to the resistor load. While a resistor limits the armature current and hence the thermal strain on the motor, it also decreases the effectiveness of the braking action, particularly at low speeds.

Regenerative braking of DC motors also employs the motor as a generator, similar to dynamic braking. However, the vital difference is that in regenerative braking the power generated by the motor is supplied back to the active power source for the motor rather than being circulated through a passive resistor load. Reduced to its essence, power may be regenerated, or supplied back to the active power source for the motor, by reversing the polarity of the armature voltage while maintaining armature current flow in the same direction or by reversing armature current flow while maintaining the polarity of the armature voltage. In either case the motor that was formerly a load becomes a power source. The advantages of such a system include the fact that braking may be done on a permanent basis, whereas plugging and dynamic braking are effective only in transient conditions or for isolated stops. Also, with proper control, the armature current may be limited, thereby eliminating the excessive motor heating experienced with other methods of braking. Braking may also be accomplished very rapidly.

Although alternating current is used as input power to a direct current motor control for many reasons, its use is particularly adapted to DC motor controls providing regenerative braking to the motor. As the voltage polarity of such an input is continually reversing on a periodic basis, voltage of either polarity may be supplied to the motor by connecting the alternating current source to the motor at the proper time.

During motoring operation, the DC motor control rectifies the alternating current input to use half cycles of one polarity of the AC power to apply a unipolarity voltage to the motor armature. The motor field is also energized with direct current to cause the motor to rotate. The rotation of the armature through the flux of the motor generates a counter E.M.F. opposing the applied voltage. The power control means, such as controlled rectifiers, in the control are arranged to be properly biased for conduction any time the counter E.M.F. is more negative than the applied voltage and to supply power from the control as a source to the motor as a load.

During regenerative operation, to cause the motor to become a source for the control, the motor field is reversed, reversing the motor flux and the polarity of the counter E.M.F. (assuming the direction of motor rotation remains instantaneously the same). The reversed counter E.M.F. again biases the controlled rectifiers to conduct current, in the same direction as during motoring, any time the counter E.M.F. is more negative than the applied alternating voltage. This includes portions of the half cycle of the other polarity, thus permitting the reversal of voltage at the control terminals necessary for regenerative operation. A regenerative DC motor control must therefore provide unidirectional current in the armature circuit any time the counter E.M.F. of the motor is more negative than the alternating voltage of the alternating current power source. This requires control during all of one half of each cycle of the alternating current input and for a portion of the other half cycle of that input.

Summary of the invention

It is, therefore, the object of the present invention to provide a controlled rectifier firing circuit capable of controlling the rectifiers in both the positive and negative half cycles of the alternating current input.

A further object of the present invention is to provide a controlled rectifier firing circuit that is capable of providing a sustained firing signal to the rectifiers, so as to permit them to become conductive as soon as they are properly biased for conduction, without causing excessive dissipation at the gate terminal of the controlled rectifiers.

The present invention provides a controlled rectifier firing circuit for controlling a plurality of complementary pairs of controlled rectifiers connected in a polyphase rectifier bridge having an input side connected to a polyphase alternating current power supply. The control exerted by the firing circuit extends through half cycles of one polarity of the alternating current and for a portion of the half cycles of the other polarity in accordance with an input signal. The firing circuit is comprised of a plurality of firing amplifiers, equal in number to the number of phases of the alternating current power supply. Each of the firing amplifiers is connected to a complementary pair of controlled rectifiers in the rectifier bridge for rendering firing signals thereto in accordance with the input signal.

Each of the firing amplifiers includes a synchronization circuit connected to the alternating current power supply for providing an energizing signal throughout synchronizing periods extending through half cycles of one polarity of the alternating current and for portions of half cycles of the other polarity. An input signal means, responsive to the energizing signal and to the input signal, generates a pulse during the synchronizing periods in accordance with the magnitude of the input signal. A current control device, operable by the pulses, causes a pulse generating circuit, energized by the energizing signal, to provide multiple firing pulses to the controlled rectifiers for rendering the controlled rectifiers conductive.

Brief description of the drawing

The specification includes the following drawings, forming a part thereof:

FIGURE 1 is a schematic diagram of the static, regenerative direct current motor control in which the firing circuit of the present invention may be employed;

FIGURE 2 is a graph of an alternating current wave form showing the principles of motoring and regenerative operation of the control;

FIGURE 3 is a detailed schematic drawing of an operational amplifier which may be used in the control of FIGURE 1;

FIGURE 4 is a schematic diagram of a controlled rectifier firing circuit which may be used to operate the controlled rectifiers in the motor field circuit of the control of FIGURE 1;

FIGURE 5 is a schematic diagram of a controlled rectifier firing circuit of the present invention which may be used to operate the rectifiers of the controlled rectifier bridge in the armature circuit of the control shown in FIGURE 1;

FIGURE 5a is a partial schematic diagram of the controlled rectifier firing circuit of FIGURE 5 showing a modification thereof;

FIGURES 7a and b are wave forms illustrating the regenerative operation of the motor field.

Description of preferred embodiment

Figure 6:
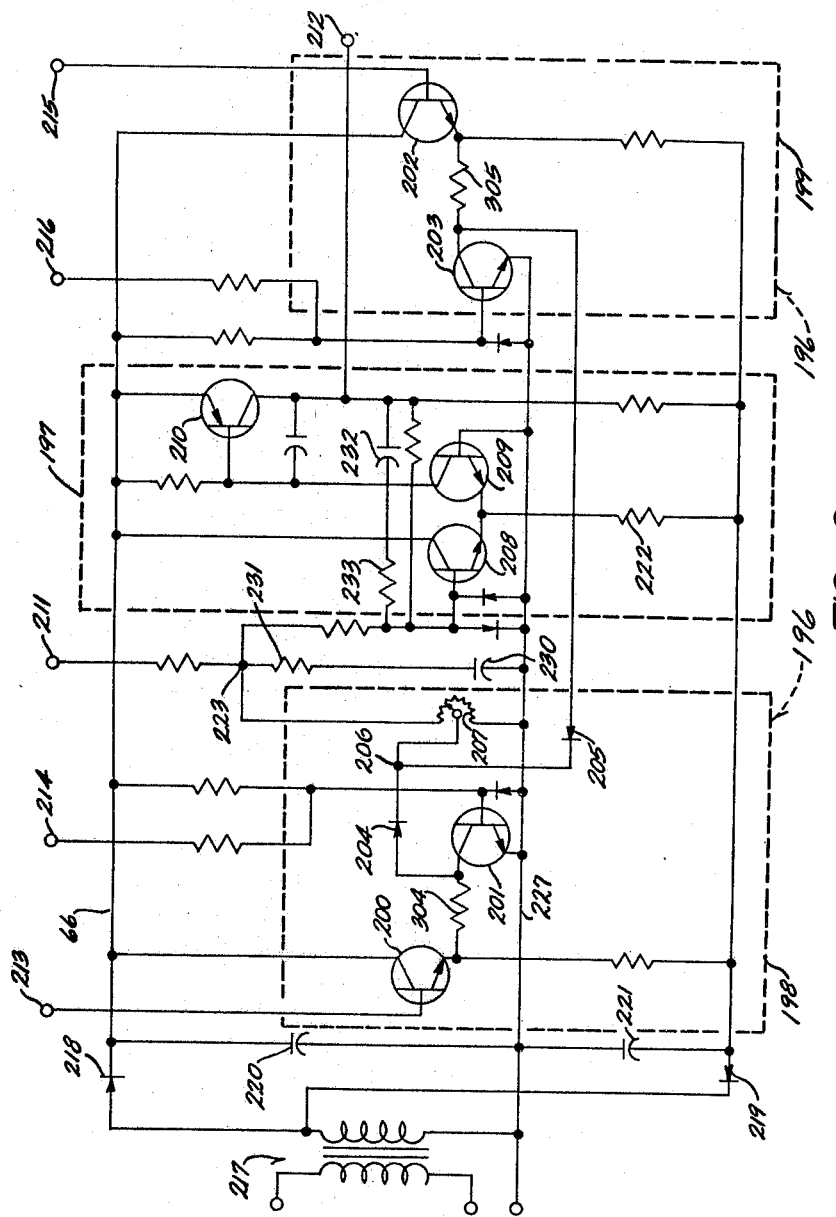
FIGURE 6 is a schematic diagram of a current regulating and regenerative logic circuit which may be used in the control shown in FIGURE 1.

Brief description of static, regenerative, DC motor control

In the following specification the regenerative, DC motor control is described as one in which the speed of the DC motor is regulated. It is to be understood that other operative conditions of the motor, such as torque, or operative conditions in the apparatus driven by the direct current motor, as for example, web tension, may be the regulated quantity.

Referring now to the drawings, and specifically FIGURE 1, a block diagram of a static, regenerative, DC motor control 10 is shown therein. Control 10 includes reference and feedback circuit 14, operational amplifier 16, field circuit 18, and armature circuit 20. The control drives the DC motor 22 consisting of armature 24 and motor field 26, each of which includes or comprises an electromagnetic coil or winding. The control is provided with input power from three phase AC lines 28.

Reference and feedback circuit 14 includes a reference signal source 30 providing a variable DC signal to conductor 32 by means of DC supply 33 and potentiometer 31. A feedback signal is provided by tachometer 34 which is connected to armature 24 and supplies a DC signal corresponding to the speed of armature 24 to conductor 36. Conductors 32 and 36 are joined at mixing junction 38 which provides an error signal to conductor 40. This error signal may be of either polarity and serves as a motoring control signal in one polarity and a regenerative braking control signal in the other polarity.

The error signal in conductor 40 is fed to operational amplifier 16 which provides a high degree of amplification to the error signal. In subsequent portions of the specification or in the claims, this amplifier may be termed the "first" amplifier to distinguish it from other amplifiers in control 10. Amplifier 16 has two output signals, both of which have abrupt saturation points. Both of the signals are proportional in magnitude to the input signal. However, the polarity of one output signal is the same as the polarity of the input error signal in conductor 40 (termed the direct output signal) while the other output signal is of the opposite polarity from the input error signal in conductor 40 (termed the inverse output signal). The graph of these output signals forms an X with the direct output signal forming one stroke, and the inverse output signal forming the other and the two signals meeting at zero output for operational amplifier 16. One of the output signals is used to control both field circuit 18 and armature circuit 20 while the other is used to control only armature circuit 20. While FIGURE 1 shows the inverse output signal of operational amplifier 16 as being supplied to both field circuit 18 and armature circuit 20 and the direct output signal of operational amplifier 16 as supplied through conductor 239 to armature circuit 20 only, the connection of these output signals may be reversed and the invention is not to be interpreted as limited to the connection shown in FIGURE 1. In any event, both signals are employed throughout all operational sequences of control 10.

Field circuit 18 includes motor field 26. The field circuit it supplied with alternating current from AC supply lines 28 through transformer 42. The output of transformer 42 contains a controlled rectifier means comprising two groups of oppositetly connected controlled rectifiers 44 and 46 and 48 and 50. These rectifiers control the direction of current flow through the winding of motor field 26, one group of rectifiers being energized for each direction of current flow. A field controlled rectifier firing circuit 52, which may be considered a push-pull proportional firing circuit, controls the operation of controlled rectifiers 44 through 50 in response to the inverse output signal from operational amplifier 16. The control provided by field controlled rectifier firing circuit 52 determines which group of controlled rectifiers will be placed in the conductive state and may also include a determination of the magnitude of the field current. Firing circuit 52 also provides for rapid reversal of the current through motor field 26 by controlling the operation of the controlled rectifiers in a manner to regenerate the motor field current back to AC supply lines 28.

Field circuit 18 also contains a resistive network comprising resistors 54 and 56. These resistors act as a limiting impedance to prevent short circuits in the motor field power circuit in the event of faulty firing of the controlled rectifiers and, as a secondary function, reduce the time constant of motor field 26. Resistors 58 and 71 provide a means of sensing the polarity of the motor field current.

Armature circuit 20 supplies power to armature 24 during motoring operation and receives power from armature 24 during regenerative operation. Armature circuit 20 is supplied with power during motoring operation from AC supply lines 28 through transformer 60. The amount of power provided to armature 24 is controlled by armature controlled rectifier bridge 62 containing controlled rectifiers 146 through 151. Terminals 306 and 307 constitute the output terminals of control 10. During regenerative operation power is supplied from motor armature 24 through armature controlled rectifier bridge 62 and transformer 60 back to AC supply lines 28.

Armature controlled rectifier firing circuit 64 controls the operation of the rectifiers in armature controlled rectifier bridge 62. In order to provide reverse voltage capabilities, this firing circuit must be capable of controlling the operation of the controlled rectifiers through one entire half cycle of alternating current from supply lines 28 and through a portion of the other half cycle.

The current regulating and regenerative logic circuit 66 performs a dual function. The regenerative logic portion thereof determines whether a combination of conditions in control are proper for the regenerating or motoring operation and operates armature circuit 20 accordingly. In making such determination, the logic circuit utilizes a pair of AND gates operable by a field polarity signal supplied by sensing reistors 58 and 71 through conductors 68 and 69 as well as the direct and inverse output signals from operational amplifier 16 supplied through conductors 238 and 239. The current regulating portion of circuit 66 regulates the armature current during motoring or regenerative operation and utilizes an armature current feedback signal supplied by conductor 70.

Description of operation of static regenerative DC motor control

The operation of control 19 may be better understood by initial reference to FIGURE 2 in which the numeral 228 indicates the alternating voltage supplied to the control through AC supply lines 28. The supply voltage 228 includes a positive half cycle 229 and a negative half cycle 230. Only a single phase of alternating current is shown in FIGURE 2 to simplify the explanation.

As previously mentioned, armature 24 generates a couner E.M.F. while rotating in the motoring state. This counter E.M.F. is indicated in FIGURE 2 by the graph 224 for the motoring operation of control 10. The controlled rectifiers 146, 148, and 150 in armature rectifier bridge 62 may conduct any time applied voltage 228 is more positive than counter E.M.F. 224 since, as shown in FIGURE 1, the anodes of the controlled rectifiers may be considered connected to AC supply voltage 228 while the cathodes of the rectifiers are connected to the armature and counter E.M.F. 224. The controlled rectifiers are properly biased for conduction anytime the anodes are more positive than the cathodes. This is the time interval between $T_1$ and $T_2$. The amount of power supplied to armature 24 and the speed of the motor 22 during motoring operation is determined by the point between $T_1$ and $T_2$ at which the rectifiers of rectifier bridge 62 are rendered conductive. The closer to time $T_1$ the rectifiers are rendered conductive, the greater the supplied power.

During regenerative operation, the energization of motor field 26 is reversed, reversing the polarity of the counter E.M.F. of the motor. The reversed counter E.M.F. is shown by the graph 225 in FIGURE 2. It will be noted that the time during which the counter E.M.F. of the motor is more negative than the applied voltage is now much greater, extending from time $T_5$ to time $T_4$. Referring to negative half cycle 230 it will also be noted that from time $T_3$ to time $T_4$ the voltage on the anodes of the controlled rectifiers 146, 148, and 150 in bridge 62, that is, applied alternating voltage 228 has negative polarity with reference to the AC source.

Since the anodes of the controlled rectifiers are more positive than the cathodes thereof, even though they are negative with reference to the AC source, the controlled rectifiers can conduct current in the same direction through bridge 62 if a signal is provided from armature controlled rectifier firing circuit 64. This current will flow from armature 24 through the controlled rectifiers of armature bridge 62 and through transformer 60 in regenerative fashion to AC supply lines 28. This is due to the fact that the polarity of the voltage on bridge 62 has reversed while the direction of current flow therethrough remains the same.

It is evident from the foregoing that armature controlled rectifier firing circuit 64 must be capable of firing the controlled rectifiers both from time $T_1$ to time $T_2$, for operation, i.e., when the counter EMF is more negative than the applied AC voltage, and also between time $T_3$ and $T_4$ for regenerative operation, i.e., when the applied AC voltage has reversed its polarity but before it becomes more negative than the counter E.M.F.

Th operation of control 10 in the manner shown graphically in FIGURE 2 is accomplished by employing two operational loops. These may be termed the inner loop and the outer loop to indicate that the former operates within the confines of the latter. The outer operational loop is utilized to control motor speed and comprises tachometer 34, operational amplifier 16, current regulating regenerative logic circuit 66, armature controlled rectifier firing circuit 64, armature controlled rectifier bridge 62 and armature 24. The outer loop controls the operation of control 10 as long as operational amplifier 16 is unsaturated. When operational amplifier 16 saturates, the above described outer loop becomes inoperative since further error signal changes in conductor 40 are not transmitted through operational amplifier 16. For normal speed regulating operation, however, the operational amplifier of the outer loop is not saturated and the inner loop serves as an active part of the outer loop.

The inner operational loop is used to regulate armature current at all times in accordance with the amplified error signal from amplifier 16. It comprises the aramature current feedback signal in conductor 70, current regulating and regenerative logic circuit 66, armature controlled rectifier firing circuit 64, armature controlled rectifier bridge 62, and armature 24. The inner loop is a complete feedback regulator employing as a reference signal one of the outputs of amplifier 16, as selected by the logic portion of current regulating and regenerative logic circuit 66, and as feedback, the signal in conductor 70. The gain and response of this inner loop regulator are sufficient to cause the armature current to accurately and rapidly follow the signal from amplifier 16, thereby causing the magnitude of armature current to be proportional to the error signal in conductor 40. However, when the error signal becomes large enough to saturate the outputs of amplifier 16, further increases in error signal can no longer cause an increase in armature current, since the reference signal to the inner current loop regulator cannot be larger than the saturated output of amplifier 16. In this manner the maximum armature current is sharply limited to a value corresponding to the saturated output of amplifier 16. One other consideration is important. Since the output of amplifier 16 may change almost instantly from a low level to its highest value the nature of response of the inner loop current regulator to an instantaneous rise in reference signal must include a complete lack of overshoot to prevent transient currents from being larger than the desired maximum value.

The field circuit 18 is operated open loop at or below the base speed of DC motor 22 except for the field polarity signal in conductor 68 and 69 to current regulating and regenerative logic circuit 66. Above the base speed of DC motor 22, field weakening is required.

To operate control 10, switch 72 is closed to energize the circuitry of the control. Reference signal source 30 is adjusted to provide a signal corresponding to desired speed. The signal is supplied through conductor 32 to junction 38 and thence to operational amplifier 16. Operational amplifier 16 produces a direct output signal and an inverse output signal proportional to the input signal in conductor 40. As armature 24 is not yet rotating there will be no feedback signal supplied by tachometer 34.

Field circuit 18 utilizes one of the output signals from operational amplifier 16 to turn on either rectifiers 44 and 46 or rectifiers 48 and 50 by means of field controlled rectifier firing circuit 52. The desired direction of rotation of the motor is determined by which of the two groups of controlled rectifiers is turned on.

Both the inverse output signal and the direct output signal of operational amplifier 16 are supplied to current regulating and regenerative logic circuit 66. This circuit determines whether conditions in control 10 are proper for motoring or regenerative operation by means of the polarity of the output signals of operational amplifier 16 and the motor field polarity signals in conductors 68 and 69. These signals operate the pair of AND gates in the logic portion of current regulating and regenerative logic circuit 66 and operate the armature circuit accordingly. For the present motoring operation, the logic portion of current regulating and regenerative logic circuit 66 determines that control 10 is, in fact, capable of such operation and passes the amplified error signal to the inner current regulating loop and thence to armature controlled rectifier firing circuit 64. Armature controlled rectifier firing circuit 64 provides a firing signal to the controlled rectifiers of armature controlled rectifier bridge 62 to energize armature 24 and accelerate the armature.

Acceleration of the armature 24 causes tachometer 34 to generate a feedback signal in conductor 36 which reduces the magnitude of the error signal in conductor 40. This likewise reduces the magnitude of both outputs of operational amplifier 16 and causes armature controlled rectifier circuit 64 to retard the firing angle of the controlled rectifiers in armature controlled rectifier bridge 62. Regulation of the speed of armature 24 is obtained by controlling the point of firing of the controlled rectifiers in armature controlled rectifier bridge 62 between time $T_1$ and time $T_2$, as shown in FIGURE 2, by the combined operation of the inner and outer operational loops.

Regenerative operation of control 10 may be brought on by reducing the reference signal in conductor 32 or by providing an overhauling load to armature 24. In either case, the feedback signal generated by tachometer 34 in conductor 36 exceeds the reference signal generated by reference signal source 30 in conductor 32. This reverses the polarity of the error signal in conductor 40 and hence the polarity of the inverse output signal and direct output signal from operational amplifier 16. Because of the high gain of operational amplifier 16 a small reversal in the polarity of the error signal is sufficient to initiate regenerative operation.

The reversed polarity of the output signal from operational amplifier 16 to field controlled rectifier firing circuit 52 causes the latter circuit to energize the other group of controlled rectifiers in field circuit 18 reversing the current through motor field 26. The time of reversal is short because the inductive energy stored in the winding of motor field 26 is regenerated through transformer 42 to AC supply lines 28 and because resistors 54 and 56 reduce the time constant of the field. The reversal of motor field 26 reverses the counter e.m.f. of armature 24 and the polarity of the signal in conductors 68 and 69.

Operational amplifier 16 provides output signals of reversed polarity to the regenerative logic portion of current regulating and regenerative logic circuit 66. In the absence of the correct motor field polarity signal from conductors 68 and 69 the logic circuit produces no output at all. The correct signal in conductor 68 or 69, indicating motor field has completed reversal, provides a signal from current regulating and regenerative logic circuit 66 to armature controlled rectifier firing circuit 64 which controls the point of firing of the controlled rectifiers between time $T_3$ and $T_4$ as shown in FIGURE 2 depending on the main magnitude of the error signal in conductor 40. As described in connection with that figure this operation provides regenerative power to alternating current supply lines 28.

If the error signal in conductor 40 is excessively large signal comprised of the saturated output of operational amplifier 16 becomes saturated and control over armature circuit conditions is delegated to the inner loop including current regulating portion of current regulating and regenerative logic circuit 66. The current feedback signal is supplied from the armature circuit to the current regulating portion of current regulating and regenerative logic circuit 66. This circuit alters the output signal to armature controlled rectifier firing circuit 64, after comparing the feedback signal with a reference signal comprised of the saturated output of operational amplifier 16, to retard a firing angle of the controlled rectifiers in armature controlled rectifier bridge 62 to maintain the armature current at the desired maximum value.

The following comprises the detailed description of the various components of control 10 shown in FIGURE 1. It is to be understood that the invention is not limited to the specific embodiments incorporated in this detailed description but may utilize equivalent circuits having similar functional characteristics.

Detailed description of operational amplifier

As previously mentioned, this amplifier has a single input and two outputs. Both of the output signals are proportional in magnitude to the input signal. However, the polarity of one output signal is the same as the polarity of the input signal while the other output signal is opposite in polarity to the input signal. The first mentioned output signal has been termed the direct output signal while the latter signal is termed the inverse output signal. The amplifier must, of course, be capable of handling input signals from conductor 40 of either polarity.

FIGURE 3 shows a circuit suitable for use as operational amplifier 16 of control 10. The operational amplifier contains two complementary, three-stage amplifiers. One such amplifier, 73, is formed of transistors 74, 76 and 78 while the other such amplifier, 75, is formed from transistors 80, 82 and 84. The input transistors of each of the aforementioned amplifiers, that is, transistor 74, and transistor 80 are closely matched for identical characteristics, so that the tendency of one such transistor to drift under operating conditions will be closely matched by the same tendency of the other transistor, thereby producing equality in the overall effect on the two amplifiers.

Amplifiers 73 and 75 are powered by a power supply consisting of transformer 86, diodes 88, and 89 and capacitors 90 and 91. The power supply also includes a voltage divider consisting of resistor 92 and resistor 93.

For reasons of overall circuit operation, it is desirable to maintain the input to input transistors 74 and 80 at zero volts. Thus, a low impedance path for the small base current required to establish the operating points of transistors 74 and 80 is provided by resistors 94 and 95 which are joined to the center of the voltage divider network. The voltage divider network provides a small voltage which is used to null the small voltage drop across resistors 94 and 95 caused by the current.

The input signal from conductor 40 is applied to operational amplifier 16 at terminals 96 and 97. A pair of diodes 98 and 99 connected in opposite polarities across input terminals 96 and 97 limit the magnitude of the input signals to that which can be handled by the operation of the amplifier. Specifically, when the magnitude of the input signal exceeds the forward conduction voltage of diodes 98 or 99, the diodes break down and short circuit terminals 96 and 97 thereby preventing an input signal in excess of the breakdown voltage from reaching amplifiers 73 or 75. This prevents excessive input signals from overdriving either of the amplifiers. Two diodes 98 and 99 are provided to accommodate input signals of either polarity.

The amplifier utilizes two feedback circuits. The first of these feedback circuits may be called the common mode feedback as it affects both transistor amplifier 73 and transistor amplifier 75 in an equal manner. The common mode feedback utilizes resistor 100 which measures the sum of the currents through the output of transistors 78 and 84, that is, through the collector and emitter terminals of those transistors. The feedback signal comprising the voltage developed across resistor 100 is compared with a reference signal generated by a votlage divider consisting of resistor 101 and a rheostat 102. The error signal between the feedback signal from resistor 100 and the reference signal from rheostat 102 is supplied through transistor 103 and resistors 104 and 105 to the emitters of transistors 74 and 80 to adjust the sum of the output of these transistors for any difference between the reference signal indicating actual total current. Transistor 75 and resistor 77 establish the operating point of transistor 103. It will be appreciated that a high degree of amplification is obtained through transistor 103 and the three transistors constituting each transistor amplifier 73 and 75 thereby providing rapid, accurate regulation of the sum of the output of transistors 74 and 80.

The second feedback circuit in operational amplifier 16 is termed the differential feedback as it affects differentially amplifiers 73 and 75. This feedback may be resistive, inductive, or capacitive; the character of the feedback changing the operating characteristics of the amplifiers which the feedback serves. For example, varying the resistance of the feedback will vary the amount of gain of the amplifier, while varying the capacitance of the feedback will vary the response time of the amplifier. Specifically, in FIGURE 3 a differential feedback is shown by conductor 106 which provides a feedback signal from the emitter collector circuit of transistor 78 through capacitor 107 to input terminal 97.

The output signals from operational amplifier 16 are supplied to terminals 108 and 109. The direct output signal appears at terminal 108 while the inverse output signal appears at terminal 109.

The first mode of operation, called the common mode, is one in which a given signal or phenomenon affects both transistor amplifiers 73 and 75 in an equal manner. Examples of common mode signals or phenomenon include variations in line voltage or variations in ambient temperature. As can be readily appreciated, it is necessary that such occurrences affect both transistor amplifier 73 and transistor amplifier 75 equally in order to maintain proper operation of control 10. The second mode of operation, termed the differential mode, is one in which a given signal or phenomenon affects one of the transistor amplifiers in a different manner than it affects the other transistor amplifier. Examples of differential mode signals include an input signal to terminals 96 and 97 or unequal drift of one or the other of transistor amplifiers 73 and 75.

As previously mentioned, the common mode feedback circuit including resistor 100 and the reference circuit including rheostat 102 insure that the total current flowing through output transistors 78 and 84 and transsistor amplifiers 73 and 75 is equal to that established by the reference signal. Thus any changes in the total current due to such things as variation in line voltage or in ambient temperature are immediately corrected by the aforementioned reference and feedback signals and the high degree of amplification provided by transistor 103 and the three transistors in each of amplifiers 73 and 75.

Operation of operational amplifier 16 in the differential mode to obtain the aforementioned direct output signal and inverse output signal is obtained by first adjusting operational amplifier 16 so that the signals at output terminals 108 and 109 are both equal to zero. Once this is accomplished, variations in the output signal at terminal 109 due to an input signal to terminals 96 and 97, is accompanied by an equal and opposite change in the output signal at terminal 108, as the total current through both transistor amplifiers 73 and 75 must remain the same because of the above described regulation provided by the feedback signal from resistor 100 and the reference signal from rheostat 102.

To provide initial adjustment to operational amplifier 16, output terminal 109 is connected through resistor 81 to input terminal 97. Resistor 81 forms a negative feedback path which tends to reduce the output signal at terminal 109 of transistor amplifier 73 to zero potential with respect to terminal 96. The output signal at terminal 109 is brought to exactly zero by adjusting rheostat 110 to alter the current input to transistor amplifier 75. Assuming that the output signal at terminal 109 is greater than zero, a signal would be applied from rheostat 110 to the input of transistor amplifier 75 to cause that amplifier to conduct more heavily. This removes some of the current flowing through transistor amplifier 73 and reduces the output signal existing at terminal 109. The reduction in current through transistor amplifier 73 occurs because the total current flowing through both transistor amplifiers 73 and 75 must remain at the value regulated by rheostat 102 and hence an increase in the current flow in one amplifier must require a decrease in current flow in the other.

After the output signal at terminal 109 has been brought into coincidence with the voltage at input terminals 96 and 97, rheostat 102 is adjusted to alter the output signal at terminal 108 so that it is also at zero. Adjustment of rheostat 102, of course, changes the amount of current in the output of the two transistor amplifiers 73 and 75. However, since the output of transistor amplifier 73 is fixed by the feedback signal between its output terminal 109 and its input terminals 96 and 97, the output of transistor amplifier 75 is varied, thereby to alter the output signal existing at terminal 108. The connection between output terminal 109 and input terminals 96 and 97 may then be removed and from this time on, an input signal to terminals 96 and 97 produces two equal output signals of opposite polarity.

It will be appreciated that the three stages of amplification in amplifiers 73 and 75 provide a high gain characteristic to operational amplifier 16. This allows the amplifiers to be extremely sensitive to changes in the polarity of the error signal in conductor 40 to operate control 10 in the motoring state or the regenerative state as required by that signal. The "dead band" found in prior art controls of this type, in which the control is unable to operate in the correct state, is thereby eliminated.

As a general rule, the output signal at terminal 109, that is, the inverted output signal is connected to field control rectifier firing circuit 52 and to current regulating and regenerative logic circuit 66. The direct output signal from terminal 108 is also connected to the current regulating and regenerative logic circuit 66. However, it is anticipated that the connections of output terminals 109 and 108 to field control rectifier firing circuit 52 and to the current regulating and regenerative logic circuit 66 will be reversed in a considerable number of applications of control 10.

Detailed description of motor field circuit

Motor field 26 is energized by center tap transformer 42 which has the motor field 26 connected in the center tap thereof. Each end of center tap transformer has one rectifier of two complementary rectifier groups connected thereto. Specifically, controlled rectifiers 44 and 46 constitute one group of rectifiers and conduct current through motor field 26 in one direction while controlled rectifiers 48 and 50 constitute the other group and conduct current through motor field 26 in the opposite direction. These rectifiers may be, and are shown in FIGURE 1 as, silicon controlled rectifiers having an anode terminal, a cathode terminal and a gate terminal. Applying a signal to the gate terminal permits the rectifier to conduct current or "fire," when the anode and cathode terminals are properly biased.

It will be appreciated that, should one rectifier of each group accidentially be turned on simultaneously, a dead short would result around a circuit comprising the two controlled rectifiers and transformer 42. Such short circuiting has been a failing of prior art controls of this type as it disables the field circuit. To prevent excessive field current from occurring under such conditions, resistors 54 and 56 are included in the motor field circuit to provide a current limiting impedance. It will be appreciated that if other means are provided to protect the motor field circuit from controlled rectifier misfires, current limiting impedances may be eliminated. These resistors also reduce the inductive time constant of motor field 26 when it is desired to reverse the direction of current flow through the motor field.

The firing of controller rectifiers 44 through 50 controlled by field controlled rectifier fiiring circuit 52 which operates the afornentioned controlled rectifiers to control the amount of current in either direction through the field from zero to maximum and provides for the rapid reversal of the current through motor field 26 by regenerating the inductive energy contained therein back to AC supply line 28. FIGURE 4 shows a field controlled rectifier firing circuit which may be used as circuit 52 of control 10 shown in FIGURE 1. Firing circuit 52 is a push-pull proportional amplifier in that it provides control to one group of rectifiers for an input signal from operational amplifier 16 of the opposite polarity. In instances wherein it is not desired to control the magnitude of the field current, the firing circuit 52 may have sufficient gain so that a small input signal will drive it full on.

Firing circuit 52 contains two uni-junction firing circuits 114 and 115, each of which controls one of the groups of controlled rectifiers 44 through 50 in the motor field circuit in response to an input signal supplied to terminals 116 and 117. Each of the uni-junction firing circuits includes a uni-junction transistor 118 and 119 which provides firing pulses through transistors 120 and 121 to output terminals 122 and 123. For example, output terminal 122 may be connected to controlled rectifiers 44 and 46 while output terminal 123 may be connected to controlled rectifiers 48 and 50. Transistors 120 and 121 insure that the output pulses from uni-junction transistors 118 and 119 are of sufficient magnitude and duration to first controlled rectifiers 44 through 50.

The aforementioned firing circuits 114 and 115 are provided with a main energization circuit, comprised of differential amplifier 124 and alternate energization circuits 125. Differential amplifier 124 is connected to input terminals 116 and 117. A differential amplifier is used to insure an input operating level near zero and to provide balanced push-pull operation. Each of the inputs is connected to a two stage portion of the differential amplifier 124. Specifically, input 116 is connected to input transistor 126 which in turn is connected to output transistor 127 while input 117 is connected to input transistor 128 and to output transistor 130. If the input levels to these terminals is zero, the output from differential amplifier 124 will be of insufficient magnitude to turn on output transistors 127 and 130. Thus no energization signal will be supplied to uni-junction transistors 118 and 119. If input signals in one polarity or the other are supplied to terminals 116 and 117, either transistor 127 or transistor 130 will become conductive. Current flow through the conductive transistor will charge either capacitor 131 or capacitor 132 which will supply an input signal to the respective uni-junction transistor 118 or 119, through diodes 300 and 301 to turn on either controlled rectifiers 44 and 46 or controlled rectifiers 48 and 50.

In addition to the aforementioned main energization circuit for uni-junction transistors 118 and 119 there is an alternative energization circuit for each of the uni-junction transistors which is completely independent of any input signal to terminals 116 and 117. These circuits, 125, comprise resistor 327, resistor 328, and capacitor 329 and resistor 330, resistor 326 and capacitor 332 respectively. The voltage provided by these circuits to the inputs of the uni-junction transistors through diodes 113 and 134, respectively, is slightly less than that needed to place the uni-junction transistors in the conductive state. The operation of these circuits will be substantially explained.

Field controlled rectifier firing circuit 52 is energized from a power supply comprised of transformer 135, diodes 136, 137, and 302 and capacitor 303.

Synchronization of field controlled rectifier firing circuit 52 with the alternating current existing in transformer 42 energizing motor field 26 is accomplished by synchronizing circuit 138. Synchronizing circuit 138 includes resistor 139, resistor 140, Zener diode 141 and transistor 142. Transistor 142 supplies power across the two base terminals of uni-junction transistors 118 and 119 and alternate energization circuits 125. The period of each half cycle of alternating curent input from supply lines 28, during which power will be supplied across the base terminals of uni-junction transistors 118 and 119 is determined by the time interval during which current will flow through Zener diode 141 and transistor 142. This interval initiates approximately 10° after the beginning of the half cycle and terminates approximately 10° before its end. During this time, a signal supplied from differential amplifier 124 will cause one or the other of uni-junction firing circuits 114 and 115 to turn on either one of the two groups of controlled rectifiers 44 through 50 in the motor field circuit 18. The instant at which the firing signal is generated is determined by the magnitude of the input signal to terminal 116 or terminal 117, an input signal or greater magnitude tending to generate a firing signal closer to the initial portions of the half cycle of alternating current, thus controlling the magnitude of the field current as well as its direction.

It is to be noted that since alternating current is applied to the controlled rectifiers, a short circuited condition in the field circuit due to stray firing can exist for only one-half cycle of AC. At the end of the half cycle, the condition will automatically correct itself as the stray fired rectifier will be biased nonconductive by the applied AC.

During the time interval that power is supplied to the bases of uni-junction transistors 118 and 119, alternate energization circuits 125 will have had sufficient time to charge capacitors 329 and 332 through resistors 327 and 328 and 330 and 326 respectively. However, as previously mentioned, the voltages across capacitors 329 and 332 are insufficient to fire the uni-junction transistors when full input power is applied across the base terminals thereof. Near the end of the cycle, the voltage applied to the base terminals of uni-junction transistors 114 and 115 necessarily become less as the end of the half cycle of alternating current input approaches. Under these conditions of lessened voltage across the bases of uni-junction transistors 118 and 119, the voltage existing across capacitors 329 and 332 becomes sufficient to fire the uni-junction transistors. This generates a firing pulse near the end of each half cycle of alternating current. It is to be noted that the firing signal generated in uni-junction transistors 118 and 119 by alternate energization circuits 125 is completely independent of any signal generated in uni-junction transistors 118 and 119 by differential amplifier 124, and occurs even though no input is applied to terminals 116 or 117.

With no input signals to terminals 116 or 117, the firing signals caused by alternative energization circuits 125 are supplied to all four rectifiers 44 through 50 of the two complementary groups that control the direction of current flow through motor field 26. As the firing pulses are supplied to all the rectifiers, the positive voltage generated in two of the rectifiers is opposed by the negative voltage generated in the other two rectifiers so that the net effect of the voltage across the motor field is zero.

When an input signal is applied to terminals 116 and 117, the firing pulse generated by alternative energization source 125 has no effect on the group of rectifiers being controlled by the main energization circuit 124 since one of these rectifiers is already conducting and the other is improperly biased for conduction. The firing pulses provided to the other group of rectifiers by alternative energization source 125 generate a current which opposes the current of the conducting rectifier. However, this condition terminates as the applied voltage reverses and the power loss to motor field 26 is of minor significance as it exists for only 10° of the cycle.

The firing pulses generated by alternate energization circuits 125 are used to rapidly reduce the current of the motor field to zero to regenerating the inductive energy stored in the field back through transformer 42 to AC supply lines 28.

Under normal operation of motor field circuit 18 where, for example, rectifiers 44 and 46 are alternately rendered conductive by field controlled rectifier firing circuit 52, the graph of the voltage at the right hand terminal of the field is shown by the graph 234 in FIGURE 7a. This is a fully rectified voltage which produces a DC current 235 through the field. The conducting rectifier is indicated below each half cycle of graph 234.

If, at some time $T_1$, rectifier 46 is not turned on during the appropriate half cycle, current will continue to flow thrrough the motor field due to its inductive characteristics. In order to maintain this current flow the motor field 26 becomes a source whose voltage exceeds the applied voltage in transformer 42 during the negative half cycle for rectifier 44. Rectifier 44 will continue to conduct during its normal half cycle as it is then properly biased for conduction. The graph of FIGURE 7a subsequent to time $T_1$ shows the field voltage under conditions where rectifier 46 is not turned on. It will be noted that, in effect, alternating voltage is applied to the field. This causes the field current to decay with a slight ripple to zero at time $T_2$. At this time rectifier 44 becomes nonconductive as there is no current therethrough and the voltage across the field ceases. It may be noted that the decay of inductive current in the motor field in the above circumstances is no more satisfactory than the time constant of the motor field.

It may also be noted that during the time that the motor field may be considered a source, the field is regenerating power to alternating current lines 28, as current is maintained in the same direction through the circuit but through the polarity of the source terminals in transformer 42 has reversed. However, during the positive half cycle of rectifier 44 power is supplied to the field. This supply and regeneration of power results in little net difference and for all practical purposes may be disregarded. Thus, there is no net regeneration or power supply to the motor field and the inductive energy of the field circuit is dissipated in its resistive portion.

In the control of the present invention, rectifiers 44 and 46 are fired on approximately 10° before the end of the half cycle of applied alternating current voltage by alternate energization means 125 in controlled rectifier firing circuit 52. The effect of this operation is shown in FIGURE 7b. As before, a plurality of cycles may be assumed to have preceded the graph in FIGURE 7b. Also as before, rectifier 44 is fired on but rectifier 46 is not turned on at the appropriate time to conduct current through the motor field from the AC source. This then causes rectifier 44 to continue to remain on to conduct current from the motor field, as a source, through transformer 42. Approximately 10° before the end of the half cycle rectifier 46 is fired on. This turns off rectifier 44 as the current now has an alternative path through rectifier 46 which is preferred since it is in the direction that transformer 42 desires to provide power to motor field 26. Rectifier 46 conducts power to the motor field for the remaining 10° of half cycle. At the end of the half cycle, the regenerative operation continues as rectifier 44 is not turned on and rectifier 46 is forced to remain on as the only path available for current flow. As the voltage of transformer 42 reverses, current is supplied to the positive terminal thereof forming the regenerative action.

For subsequent half cycles, similar operations are performed. This is, rectifier 44 is turned on in the last 10° of the half cycle to regenerate the inductive energy of the motor field back to power lines 28 when the voltage of transformer 42 again reverses. The net effect is a very large regenerative portion of the half cycle and a small power supplying portion; the power supplying portion being only the final 10° of each half cycle. This rapidly reduces the current in the motor field 26 as shown in FIGURE 7b.

Detailed description of armature circuit

Motor armature 24 is inserted across the output terminals of armature controlled rectifier bridge 62 of control 10. Armature controlled rectifier bridge 62 comprises controlled rectifier 146, 147, 148, 149, 150, and 151 arranged in complementary pairs and connected in a conventional three phase bridge configuration having output terminals 306 and 307. The three phase secondary winding of transformer 60 is connected to the input terminals of armature controlled rectifier bridge 62.

The control of controlled rectifiers 146 through 151, both as to which rectifiers will conduct and for how long, is controlled by armature controlled rectifier firing circuit 64 of the present invention. As previously mentioned, this firing circuit must control the operation of the controlled rectifiers of armature controlled rectifier bridge 62 throughout the entire period when the counter E.M.F. is more negative than the applied alternating current voltage.

FIGURE 5 shows a firing circuit suitable for use as armature controlled rectifier firing circuit 64. Firing circuit 64 is, in reality, three separate firing circuits or amplifiers 264, 364, and 464, each of which is connected to a complementary pair of controlled rectifiers in armature controlled rectifier bridge 62 to conduct current from transformer 60 through armature controlled rectifier bridge 62 to armature 24 and back through armature controlled rectifier bridge 62 to transformer 60. The input signal to armature controlled rectifier firing circuit 64 is supplied to terminals 156 and 157 and input transistors 158, 159 and 160. These transistors are connected to the three firing amplifiers 264, 364, and 464. Current feedback from the individual firing circuits to input transistors 158 through 160 is provided by resistors 161, 162 and 163, and by rheostat 164 and rheostat 165. These feedbacks stabilize the input to firing circuits 264, 364 and 464 and also, by adjustment of rheostats 164 and 165, balance the inputs of the three individual firing amplifiers.

Firing amplifiers 264, 364 and 464 contain identical circuitry, and for purposes of explanation only firing amplifier 264 will be explained in detail. It is to be understood that firing amplifiers 364 and 464 are identical in construction.

Referring now to firing amplifier 264, the output of input transistor 158 is supplied through resistor 166 to capacitor 167 which supplies an input to uni-junction transistor 168. The output from the base terminals of uni-junction transistor 168 is applied to a pair of transistors 169 and 170. These transistors form a two-transistor analogy to a silicon controlled rectifier. That is, they form a four layer semi-conductor structure similar to that found in a silicon controlled rectifier. The combined operation of transistors 169 and 170 is similar to that of a silicon controlled rectifier and it is to be understood that such a controlled rectifier may be used if desired. See FIGURE 5a which shows the use of a controlled rectifier 170A. The two-transistor analogy to silicon controlled rectifier operation is explained more thoroughly in the second edition of the Silicon Controlled Rectifier Manual published by the General Electric Company in 1961.

Certain advantages accrue from the use of two-transistors 169 and 170 rather than a single silicon controlled rectifier in firing amplifier 264. Specifically, the firing current and the holding current may be determined by passive elements in the network. The firing current is that current necessary to place the transistor or SCR in the conductive state when applied to the base or gate terminal. The holding current is that current which must pass between the two emitters of the two transistors configuration or between the anode and cathode of the silicon controlled rectifier in order to maintain the device in the conductive state. In firing amplifier 264 these currents are determined by the resistive network comprised of resistors 171, 172, 173, 174, and 175. Additionally, an extra terminal, that is the collector terminal of transistor 170, is provided by the two-transistor configuration that is unavailable when a silicon controlled rectifier is used.

The aforementioned collector terminal of transistor 170 is supplied to a uni-junction relaxation oscillator comprised of unijunction transistor 176, capacitor 177, resistor 178, resistor 179 and resistor 240. The rate of oscillation of this oscillator is determined by the various circuit components connected therewith and is designed to be much faster than the rate of pulse generation provided by uni-junction transistor 168. It will be appreciated that, when a pulse is generated by uni-junction transistor 168, triggering and retaining transistor 170 in the conductive state, a signal will be applied from the collector of transistor 170 to uni-junction transistor 176 and a series of rapid pulses from the base terminals of uni-junction transistor 176 will be supplied to pulse transformer 180 for the remainder of a synchronization period, hereinafter described. The pulses from uni-junction transistor 176 are amplified by transistor 181 before being supplied to pulse transformer 180. Pulse 180 is connected to two controlled rectifiers in armature controlled rectifier bridge 62 by output windings 380.

The rapid pulses from uni-junction transistor 176 will be supplied to pulse transformer 180 for the remainder of the synchronization period determined by synchronizing circuit 182. Synchronizing circuit 182 includes transistor 183, rectifier 184, resistor 185, resistor 186, rectifier 187, and capacitor 188 and serves to synchronize the operation of firing amplifier 264 to the AC supply frequency. Synchronizing circuit 182 is connected between the above described pulse generating components and a power supply comprised of transformer 189 and diodes 190 and 192. The primary of transformer 189 is connected to alternating current supply lines 28.

At the beginning of each positive half cycle of alternating current supplied by transformer 189, transistor 183 will be turned on rapidly by means of a signal supplied through rectifier 187 and resistor 185. Current flow through rectifier 187 also charges capacitor 188 so that its lower terminal is positive. The turning on of transistor 183 provides power to the remainder of firing amplifier 264 and allows a uni-junction transistor 176 to generate rapid pulses to pulse amplifier 180 when transistor 170 has been turned on by unijunction transistor 168. The instant at which uni-junction transistor 176 begins generating pulses is determined by the magnitude of the input signal to terminals 156 and 157, input signals of greater magnitude tending to initiate pulse generations earlier in the positive half cycle of alternating current power.

At the end of the positive half cycle of alternating current, capacitor 188 discharges through resistors 186 and 185. This provides a bias to the base of transistor 183 that allows that transistor to remain on for a portion of the negative half cycle. When capacitor 188 is discharged, transistor 183 becomes nonconductive, terminating pulse generation by uni-junction transistor 176. The portion of the negative half cycle during which transistor 183 is conductive depends upon the magnitude of capacitor 188. Thus, firing amplifier 264 will initiate pulse generation by uni-junction transistor 176 in the negative half cycle of alternating current power for a small input to terminals 156 and 157, i.e., from time $T_3$ to $T_4$ in FIGURE 2. As the input signal is increased, the initiation of pulse generation by uni-junction transistor 176 will advance from the negative half cycle of alternating current power into the positive half cycle and may be moved to near the beginning of the positive half cycle of alternating current. The pulses generated by uni-junction transistor 176 and supplied to pulse transformer 180 tend to place the controlled rectifiers in armature controlled rectifier bridge 62 in the conductive state. The controlled rectifiers will actually begin conducting when they have become properly biased across the anode and the cathode terminals.

It will be appreciated that controlled rectifier bridge 62 is operated generally as a full wave rectifier bridge during motoring operation, i.e. in the positive half cycles, and as a half wave rectifier bridge during regenerative operation, i.e., during the negative half cycles.

By using a plurality of rapid pulses, armature controlled rectifier firing circuit 64 insures that the controlled rectifiers of armature controlled rectifier bridge 62 will be turned on at the earliest possible time they become properly biased across the anode and cathode. If the single pulse were employed to render the controlled rectifiers conductive, such pulse might be delivered at a time when the controlled rectifier was improperly biased and, hence, the controlled rectifier would never be turned on. The controlled rectifiers could also be turned on by an AC rider or straight DC energization to the gate terminal. However, if signals of this type of sufficient magnitude to insure dependable firing are used, they cause excessive gate dissipation, shortening the life of the controlled rectifier. It will be appreciated that, with the plurality of rapid pulses of short duration provided by the armature controlled rectifier firing circuit 64, excessive gate dissipation is prevented yet reliable firing is provided, since each individual pulse may be of considerable magnitude. Additionally, as previously mentioned, armature controlled rectifier firing circuit 64 insures that the controlled rectifiers will be turned on as soon as they are properly biased across their anodes and cathodes.

Current regulating and regenerative logic circuit 66 supplies the control or input signal to armature controlled rectifier circuit 64. A circuit which may perform the functions of armature current regulation and regenerative logic is shown in FIGURE 6. As its name implies, circuit 66 includes a regenerative logic portion 196 and a current regulating portion 197. Both the regenerative logic portion 196 and the current regulating portion 197 are energized by a power supply circuit consisting of transformer 217, rectifiers 218 and 219 and filter capacitors 220 and 221.

Regenerative logic portion 196 determines whether control 10 is capable of regenerating or motoring on the basis of the polarities of the signals from operational amplifier 16 and from the motor field via conductors 68 and 69 and operates the armature circuit 20 accordingly. Regenerative logic portion 196 is comprised of two AND gates which require the correct combination of signal polarities from the aforesaid sources to produce an output from one of them.

More specifically, regenerative logic portion 196 is comprised of AND gate 198 and AND gate 199. AND gate 198 consists of transistor 200, connected in emitter follower configuration, and transistor 201, while AND gate 199 consists of transistor 202, also connected in emitter follower configuration, and transistor 203. The outputs of AND gates 198 and 199 are supplied through diodes 204 and 205, respectively, and through rheostat 207 to the input of current regulating portion 179.

The input signals to the regenerative logic AND gate 198 consist of the inverse output signal from operational amplifier 16 applied to input terminal 213 and the field polarity signal in conductor 68 applied to input terminal 214. The input signals to the regenerative logic AND gate 199 consist of the direct output signal from operational amplifier 16 applied to input terminal 215 and the field polarity signal in conductor 69 applied to terminal input 216.

For either AND gate 198 or AND gate 199 to open and supply a signal to current regulating portion 197, input signals of the correct polarity must be present at both input terminals of the AND gate. For example, during motoring operation in one direction, an input signal from operational amplifier 16 is supplied to terminal 213 which is of a polarity to bias transistor 200 into the conductive state. An input signal from conductor 68 to terminal 214, indicating the direction of current flow in the motor field 26, will be of a polarity to bias transistor 201 off thereby preventing that transistor from diverting the output of transistor 200 to conductor 227. This opens AND gate 198 and the output of transistor 200 which is proportional to the error signal in conductor 40, amplified by operational amplifier 16, is supplied through resistor 304 and diode 204 to potentiometer 207 to control current regulating portion 197 which in turn controls the operation of armature firing circuit 64.

The polarity of the input signal from operational amplifier 16 to terminal 215 being of the opposite polarity of the signal applied to terminal 213 prevents transistor 202 from conducting and, hence, no signal can emanate from AND gate 199. Further, transistor 203 is biased on tending to divert any output from transistor 202 to conductor 227.

When control 10 undergoes regenerative operation, the polarities of the signals from operational amplifier 16 to input terminals 213 and 215 reverse as the polarity of the error signal has reversed. This turns off transistor 200. The reversed polarity of the input signal to terminal 215, however, turns transistor 202 on. The polarity of the input signals to terminals 214 and 216 does not reverse instantaneously when control 10 initiates regenerative operation as it takes a finite time for the motor field 26 to reverse. During this time no signal will appear from AND gate 198 as transistor 200 is biased off and no signal will appear from AND gate 199 as transistor 203 diverts the output of transistor 202 since the polarity of the signal in conductor 69 applied to terminal 216 has not yet reversed.

When the direction of current flow through the motor field 26 does reverse, indicating the motor field is now ready for regenerative operation, the polarity of the signal in conductor 69 reverses. This turns off transistor 203 and opens AND gate 199 to provide a control signal through diode 205 to junction 206 which acts as a control signal during regenerative operation of the control.

Operation in the other direction of motor rotation is the opposite of the above described operation.

Current regulating portion 197 of current regulating and regenerative logic circuit 66 consists of a two stage amplifier with the associated input, feedback, and output circuits. The first of the amplifier consists of transistors 203 and 209 and is a differential stage. The total current through both transistors 208 and 209 is determined by the supply voltage across capacitor 221 and the value of resistor 222. A variation in the emitter collector current of transistor 208 provides an equal but opposite variation to the emitter collector current of transistor 209 in order to maintain the total current constant. This variation is applied to the base of transistor 210 forming the second stage of the amplifier. The output of the emitter collector circuit of transistor 210 is applied to output terminal 212.

The inputs to current regulating circuit 197 consist of the signal from the regenerative logic circuit 196 applied to potentiometer 207 and a signal proportional to armature current supplied to input terminal 211. The magnitude of the signal applied to junction 223 from regenerative logic circuit 196 is controlled by potentiometer 207 and the magnitude of the output signals of operational amplifier 16. This signal is then mixed with the current feedback signal at junction 223 to form an error signal which is supplied to the base of transistor 208. As the current feedback signal is a series of current pulses, the error signal is filtered through capacitor 230 and resistor 231.

A compensating feedback is also provided in current regulating portion 196. This is a negative feedback from the output of transistor 210 to the input of transistor 208 and is passed through capacitor 232 and resistor 233. This feedback alters the time response of the amplifier to prevent overshoot and to insure stable, balanced firing of armature controlled rectifier bridge 62. The compensating feedback must be of a sufficient magnitude so that there is no overshoot under the most severe input signal conditions.

The output signal is supplied to terminal 212. This output signal is inverted with respect to the input signal. Specifically, because of the differential configuration of transistors 208 and 209, an increase in the signal to the base of transistor 208 increases the output of that transistor while decreasing the output of transistor 209 since the total current flow through both of them must be constant. The decrease in output of transistor 209 is amplified by transistor 210 and supplied to output terminal 212. The reason for inverting the output signal is to simplify obtaining the negative feedback signal required for the compensating feedback. The polarity of the output from circuit 66 is arranged so that an increased error signal results in an increased or advanced firing angle to the controlled rectifiers in bridge 62.

The operation of the current regulating portion 197 of current regulating and regenerative circuit 66 is critical to the overall operation of control 10 as portion 197 operates the previously described inner current regulating loop of the control. This inner loop is a true regulating circuit with both reference and feedback signals and is of high gain so that only a small error signal between the reference and the feedback is sufficient to produce maximum output.

Because of the true regulating action of current regulation portion 197, the armature current is maintained at all times proportional to the reference signal from potentiometer 207, which is in turn proportional to the output signals of operational amplifier 16, except when the AND gates 198 and 199 of regenerative logic circuit 196 are not open.

Current limiting action of the inner current regulating loop occurs when the input signals to operational amplifier 16 are of sufficient magnitude to cause saturation of its output. When the output of operational amplifier 16 becomes saturated, a limit is reached in the magnitude of signal that can be delivered through either AND gate 198 or 199 and potentiometer 207. Since the signal through potentiometer 207 is the reference to current regulating portion 197, a limit is also placed on the amount of armature current that the inner current regulating loop will allow. This action provides the aforementioned sharp current limit. It will also be noted that the current limit action is obtained without the necessity of transiently excessive armature current to trigger the limiting means.

The compensating feedback through capacitor 232 and resistor 233 around current regulating portions 197 modifies its response to prevent overshoot of armature current under the most abrupt saturation of operational amplifier 16.

A full appreciation of the relationship and interaction of the detailed elements of the above described components in the structure and operation of the control may be had by referral to the foregoing Description of Operation of Static Regenerative DC Motor Control and reference is hereby made to that portion of the specification.

What is claimed is:

1. A controlled rectifier firing circuit for controlling a plurality of complementary pairs of controlled rectifiers connected in a polyphase rectifier bridge having an input side connected to a polyphase alternating current power supply, the control exerted by said firing circuit extending through half cycles of one polarity of the alternating current and for a portion of half cycles of the other polarity in accordance with an input signal to said firing circuit, said firing circuit being comprised of a plurality of firing amplifiers, equal in number to the number of phases of the alternating current supply, each of said firing amplifiers being connected to a complementary pair of controlled rectifiers in said rectifier bridge for rendering firing signals thereto in accordance with the magnitude of said input signal and comprising:

a synchronization circuit connected to said alternating current power supply for providing an energizing signal throughout synchronizing periods extending through half cycles of one polarity of the alternating current and portions of half cycles of the other polarity;

an input signal means responsive to said energizing signal and to the input signal for generating a pulse during the synchronizing periods, the point of pulse generation being determined by the magnitude of the input signal;

a current control device operable by said pulses; and a pulse generating means energized by said energizing signal and rendered operative by said current control device for providing multiple firing pulses to said controlled rectifiers for rendering said controlled rectifier conductive.

2. The controlled rectifier firing circuit of claim 1 wherein said current control device is a four layer semiconductor device having an input connected to said input signal means and having an output connected to said pulse generating means.

3. The controlled rectifier firing circuit of claim 1 wherein said current control device is a silicon controlled rectifier.

4. The controlled rectifier firing circuit of claim 1 wherein said current control device is comprised of two transistors connected in a manner to provide operation analogous to that of a silicon controlled rectifier.

5. The controlled rectifier firing circuit of claim 1 wherein said input signal means includes a uni-junction transistor for generating said pulses.

6. The controlled rectifier firing circuit of claim 1 wherein said pulse generating means includes a uni-junction transistor for providing said multiple firing pulses to said controlled rectifiers.

7. The controlled rectifier firing circuit of claim 1 wherein said synchronization circuit includes a rectifier means responsive to half cycles of one polarity of said alternating current power supply, control means operable by said rectifier means for providing said energizing signal and signal means for operating said control means for the portions of half cycles of the other polarity.

8. The controlled rectifier firing circuit of claim 8 wherein said control means comprises an electron flow device.

9. The controlled rectifier firing circuit of claim 8 wherein said signal means comprises a capacitor connected to said rectifier means.

References Cited

UNITED STATES PATENTS

| 3,281,645 | 10/1966 | Spink | 321—47 |
| 3,315,098 | 4/1967 | Eckl | 307—252 |
| 3,332,008 | 7/1967 | Mueller et al. | 318—345 |

LEE T. HIX, Primary Examiner

W. H. BEHA, JR., Assistant Examiner

U.S. Cl. X.R.

318—345, 376; 321—47